March 18, 1930. G. R. BROWN 1,751,262
BRACKET COUPLING FOR APPARATUS FOR ELECTRIC LIGHTING SYSTEMS
Filed Aug. 31, 1926
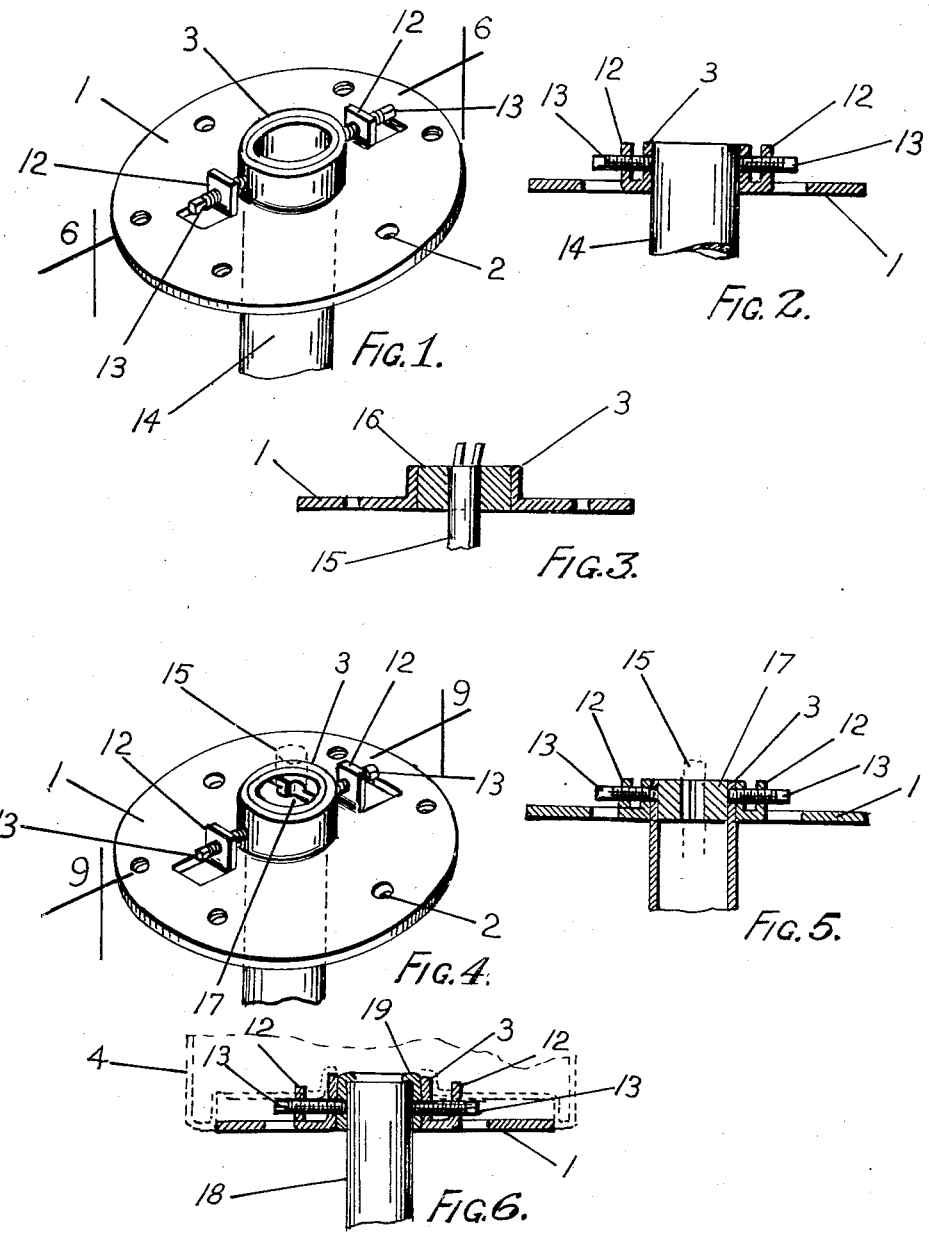
George Rudston Brown
INVENTOR
By Otto Munk
his Attorney Patented Mar. 18, 1930

1,751,262

UNITED STATES PATENT OFFICE

GEORGE RUDSTON BROWN, OF CROYDON, NEAR SYDNEY, AUSTRALIA

BRACKET COUPLING FOR APPARATUS FOR ELECTRIC-LIGHTING SYSTEMS

Application filed August 31, 1926, Serial No. 132,718, and in Australia December 11, 1925.

This invention relates to bracket couplings or supports for apparatus for electric lighting systems such as supports or couplings for switches, junction, or fuse or other boxes, or the like.

The invention consists briefly in a bracket coupling of the character described, in which a neck portion is fitted to an electric lead, the neck being of uniform plain surface both interiorly and exteriorly, and having a disc portion with integral lugs at opposite sides of the neck to accommodate clamping screws, which are adjustable in the lugs and neck, whereby close electrical joint connection may be made with said neck.

The invention also consists in the combination with the said bracket of a sleeve adapted to fit the interior of the neck, and the clamping screws are fittable to the lugs, neck, and sleeve, whereby close electrical joint connections can be made with said neck.

Referring to the accompanying drawings in which the invention is illustrated Fig. 1 is a perspective view of the bracket attached to a conduit by screws; Fig. 2 is a sectional view on plane 6—6, Fig. 1; Fig. 3 is a sectional view of the bracket with armored lead attached thereto; Fig. 4 is a perspective view of the bracket with armored lead attached thereto by means of metal block and screws; Fig. 5 is a sectional view on plane 9—9, Fig. 4; and Fig. 6 is a sectional view similar to Fig. 5 showing a reducing joint for a conduit.

Referring to the drawings the bracket coupling consists of a metal disc or plate 1 having any required number of openings 2 therein whereby it may be attached to electrical current distribution apparatus and also to a suitable support, the said disc also having a through holed neck 3 which is plain surfaced internally and externally. The disc or plate 1 may be attached to an electrical current distribution apparatus 4 by screws or in any other suitable manner.

The bracket as shown in Figs. 1 and 2, is provided with a disc 1 having integral lugs 12 cut from the metal of the disc 1 and screw-threaded to receive the oppositely disposed screws 13 which enter openings in the neck 3 to abut a conduit 14 to hold the latter within the said neck. Electrical lead wires can be associated with said conduit 14.

When an armored lead 15 (Fig. 3) is to be attached to the neck 3 such lead 15 may have affixed thereto a metal block 16 which may be soldered or otherwise connected to the neck 3.

An armored lead 15 may also be attached to the neck 3 by means of the screws 13 (Figs. 4 and 5) clamping a metal block 17 to the neck 3, the lead 15 being connected to the said block 17.

If it should happen that a conduit 18 (Fig. 6) is to be attached to the neck 3 and its diameter is smaller than the internal diameter of the neck 3, a metal sleeve 19 may be provided to fit the space in the neck 3 between the conduit 18 and the neck 3 and the clamping screws 13 may fit the lugs 12, neck 3, and sleeve 19 and thus clamp the conduit 18 to the neck 3. Electrical lead wires can be associated with the conduit 18.

The design of the bracket coupling is such that when the electrical apparatus is connected thereto and the disc is suitably attached to a support, if there should be any short circuiting of current through the electrical apparatus, the coupling may serve as a direct connection to earth, thus saving damage generally to the said apparatus, and providing safety means against damage or death to individuals through such short circuiting. It will be clear that the disc 1 is made of metal and that the screws 13 are also of metal and serve to make close electrical contact between the electrical leads and the coupling whereby if any short circuiting of current should occur the electrical apparatus associated with the coupling will be earthed.

What I claim as my invention and desire to secure by Letters Patent is:—

1. A stamped metal bracket coupling for electric lighting systems, comprising a relatively thin metal disc having a struck up cylindrically shaped neck portion provided externally and internally with smooth surfaces, the disc being provided with integral lugs struck up from the thin metal on opposite sides of the neck portion, and clamping screws adjustable through said lugs and neck, whereby close electrical joint connections may be established with said neck.

2. A stamped metal bracket coupling for electrical lighting systems, comprising a relatively thin metal disc having a struck up cylindrically shaped neck portion provided externally and internally with smooth surfaces, the disc being provided with integral lugs struck up from the thin metal on opposite sides of the neck portion, a sleeve fitting the bore of said neck, and clamping screws adjustable through the lugs, neck and sleeve, whereby close electrical joint connections may be established with said neck.

In testimony whereof I affix my signature.

GEORGE RUDSTON BROWN.